United States Patent
Bartow

(10) Patent No.: US 10,636,050 B1
(45) Date of Patent: Apr. 28, 2020

(54) SYSTEM FOR PROCESSING PAYMENT FOR PRODUCTS AND RELATED METHODS

(71) Applicant: INMAR CLEARING, INC., Winston-Salem, NC (US)

(72) Inventor: Bryan Bartow, Leander, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 102 days.

(21) Appl. No.: 16/023,704

(22) Filed: Jun. 29, 2018

(51) Int. Cl.
*G06Q 30/02* (2012.01)
*G06Q 20/20* (2012.01)
*G06Q 20/40* (2012.01)
*G06Q 20/36* (2012.01)

(52) U.S. Cl.
CPC ....... *G06Q 30/0238* (2013.01); *G06Q 20/202* (2013.01); *G06Q 20/208* (2013.01); *G06Q 20/363* (2013.01); *G06Q 20/4014* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 4,675,515 A | * | 6/1987 | Lucero | G06Q 20/342 186/41 |
| 2002/0095333 A1 | * | 7/2002 | Jokinen | G06Q 30/02 705/14.26 |
| 2013/0297504 A1 | * | 11/2013 | Nwokolo | G06Q 20/36 705/41 |
| 2014/0129435 A1 | * | 5/2014 | Pardo | G06Q 20/363 705/41 |
| 2015/0134518 A1 | * | 5/2015 | Turovsky | G06Q 20/12 705/41 |
| 2015/0227913 A1 | * | 8/2015 | Ballout | G06Q 20/3223 705/42 |

* cited by examiner

Primary Examiner — Vincent M Cao
(74) Attorney, Agent, or Firm — Allen, Dyer, Doppelt + Gilchrist, P.A.

(57) ABSTRACT

A system for processing payment for products for purchase may include a point-of-sale (POS) terminal and a promotions processing server coupled to the POS terminal and that may include a processor and an associated memory coupled thereto. The processor may be configured to store in the memory a respective digital coupon wallet for each user and present, to the POS terminal, a digital coupon in the respective digital coupon wallet for a given user for at least one product. The processor may also be configured to generate a supplemental, full-price, digital coupon for a remaining purchase price after application of the digital coupon to a purchase price of the at least one product and present, to the POS terminal, the supplemental, full-price, digital coupon.

22 Claims, 6 Drawing Sheets

SYSTEM FOR PROCESSING PAYMENT FOR PRODUCTS AND RELATED METHODS

TECHNICAL FIELD

The present invention relates to the field of electronics, and, more particularly, to processing a payment and related methods.

BACKGROUND

Sales of a particular product or service may be based upon how well that product or service is marketed to a consumer. One form of marketing is an offer, for example, a coupon or rebate, typically in paper form, for a discount toward the product or service. Some offers may be retailer specific, for example, only redeemable for the discount at a particular retailer, while other offers may be product specific from a manufacturer and redeemable at any retailer.

A coupon or rebate, for example, while typically in paper form, may be in digital form and may be referred to as a digital promotion or offer. A digital promotion may be selected or "clipped" via a mobile phone and saved to a digital wallet for redemption at a point-of-sale (POS) terminal, for example, or post-transaction. A typical coupon or rebate is applicable to a given product and has a redeemable value that may vary based upon the quantity of a given item, for example, brand of item, size of the product in terms of packaging, and/or the price point of the given item. A typical coupon or rebate may also be redeemable only at a given retailer and/or within a threshold time period.

To make a payment toward a product or service, for example, at a POS terminal, a physical card or cash may be presented. Alternatively, a mobile payment and digital wallet service may be used, which may permit a user to make a payment through an application and without presenting a physical payment card (i.e., using contactless payment POS terminals). Most mobile payment and digital wallet services operate with POS terminals that have contactless payment capabilities, while some do typically require specific programming for a given service.

SUMMARY

A system for processing payment for products for purchase may include a point-of-sale (POS) terminal and a promotions processing server coupled to the POS terminal and that may include a processor and a memory coupled thereto. The processor may be configured to store in the memory a respective digital coupon wallet for each user and present, to the POS terminal, a digital coupon in the respective digital coupon wallet for a given user for at least one product. The processor may also be configured to generate a supplemental, full-price, digital coupon for a remaining purchase price after application of the digital coupon to a purchase price of the at least one product; and present, to the POS terminal, the supplemental, full-price, digital coupon.

The processor may be configured to prompt the given user to accept the supplemental, full-price, digital coupon for the remaining purchase price; and present, to the POS terminal, the supplemental, full-price, digital coupon based upon acceptance thereof, for example. The processor may be configured to debit a financial account associated with the given user for the remaining purchase price.

The processor may be configured to store in the memory a respective payment wallet associated with the given user, and including financial account data associated with a plurality of financial accounts; and to debit a user selected one of the plurality of financial accounts for the remaining purchase price. The processor may be configured to store in the memory a respective digital rebate wallet associated with the given user, present, to the POS terminal, a digital rebate in the respective digital rebate wallet for the given user; and generate the supplemental, full-price, digital coupon for the remaining purchase price after application of the digital coupon and digital rebate to a purchase price of the at least one product, for example.

The POS terminal may be configured to scan the products being purchased during a purchase transaction. The processor may be configured to authenticate the given user based upon the POS terminal, for example.

The system may further include a mobile wireless communications device communicating with the processor. The processor may be configured to authenticate the given user based upon the mobile wireless communications device, for example.

A method aspect is directed to a method of processing payment for products for purchase. The method may include using a promotions processing server coupled to a POS terminal to store in a memory a respective digital coupon wallet for each user and present, to the POS terminal, a digital coupon in the respective digital coupon wallet for a given user for at least one product. The method may also include using the promotions processing server to generate a supplemental, full-price, digital coupon for a remaining purchase price after application of the digital coupon to a purchase price of the at least one product; and present, to the POS terminal, the supplemental, full-price, digital coupon.

A computer readable medium aspect is directed to a non-transitory computer readable medium for processing payment for products for purchase. The non-transitory computer readable medium may include computer executable instructions that when executed by a processor of a promotions processing server cause the processor to perform operations. The operations may include storing, in a memory coupled to the processor, a respective digital coupon wallet for each user; and presenting, to a POS terminal coupled to the processor, a digital coupon in the respective digital coupon wallet for a given user for at least one product. The operations may also include generating a supplemental, full-price, digital coupon for a remaining purchase price after application of the digital coupon to a purchase price of the at least one product and presenting, to the POS terminal, the supplemental, full-price, digital coupon.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
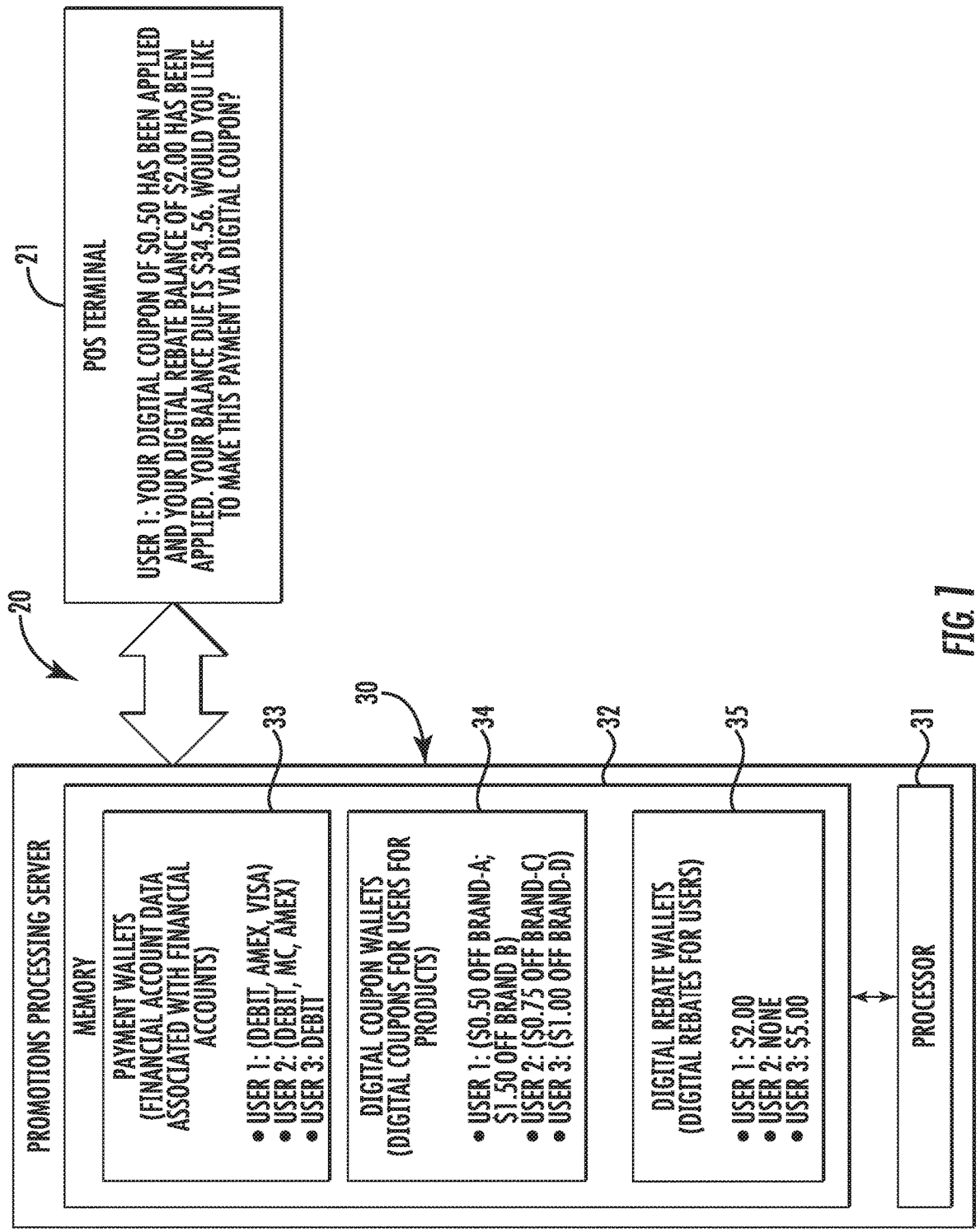
FIG. 1 is a schematic diagram of a system for processing payment for products for purchase in accordance with an embodiment.
Figure 2:
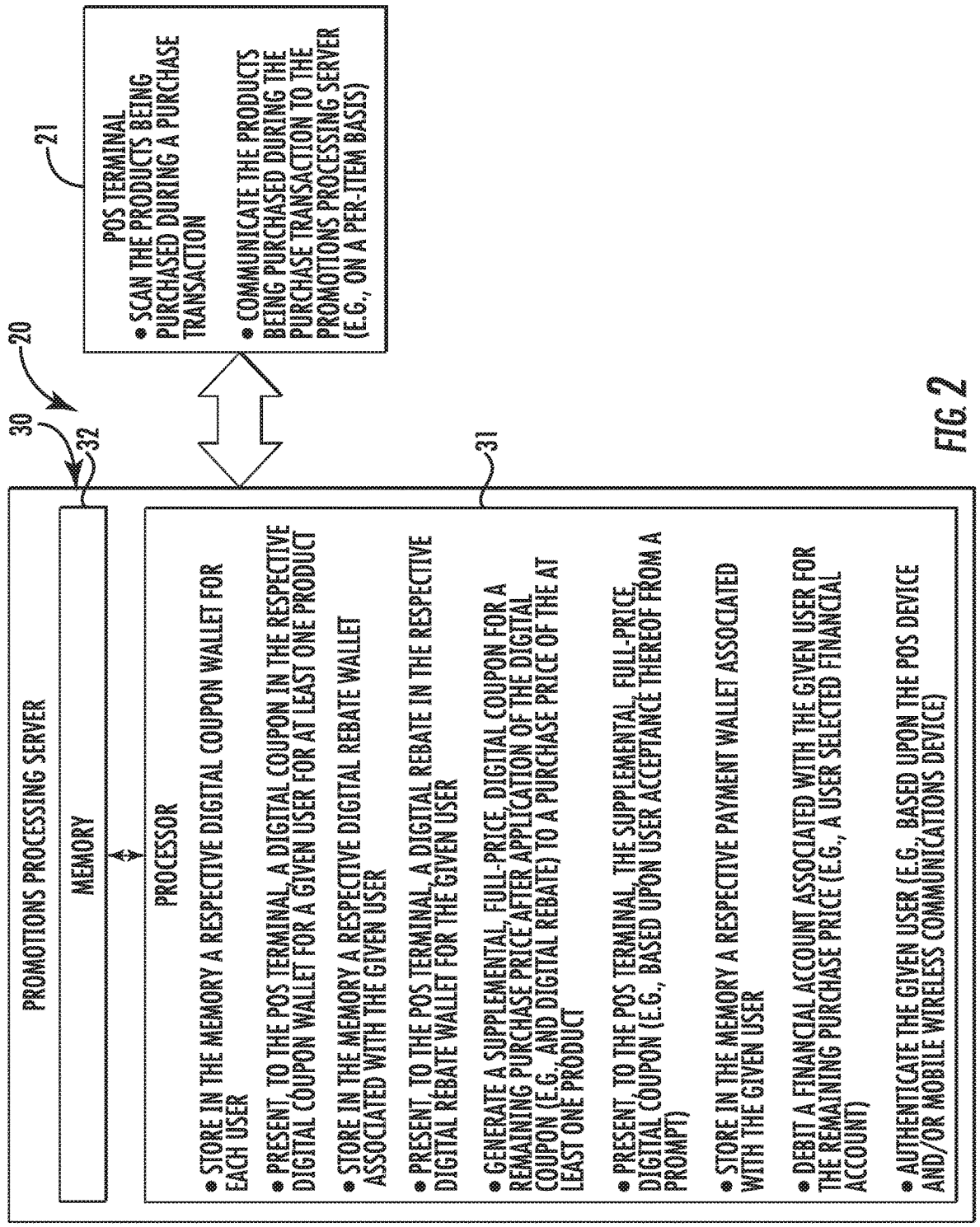
FIG. 2 is another schematic diagram of a system for processing payment for products for purchase in accordance with an embodiment.
Figure 3A:
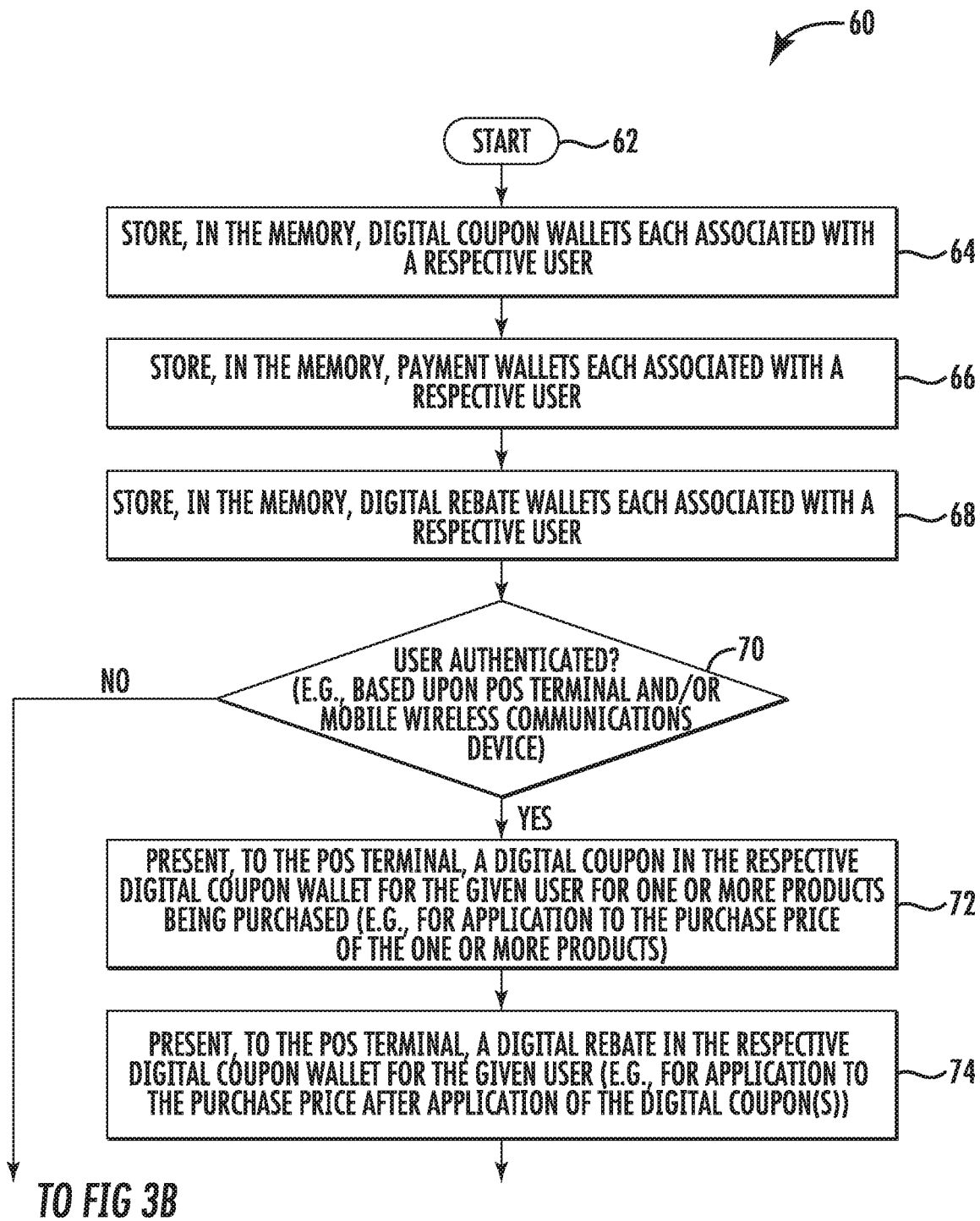
FIGS. 3A and 3B are flow diagrams illustrating processing a payment for products for purchase in accordance with an embodiment.
Figure 3B:
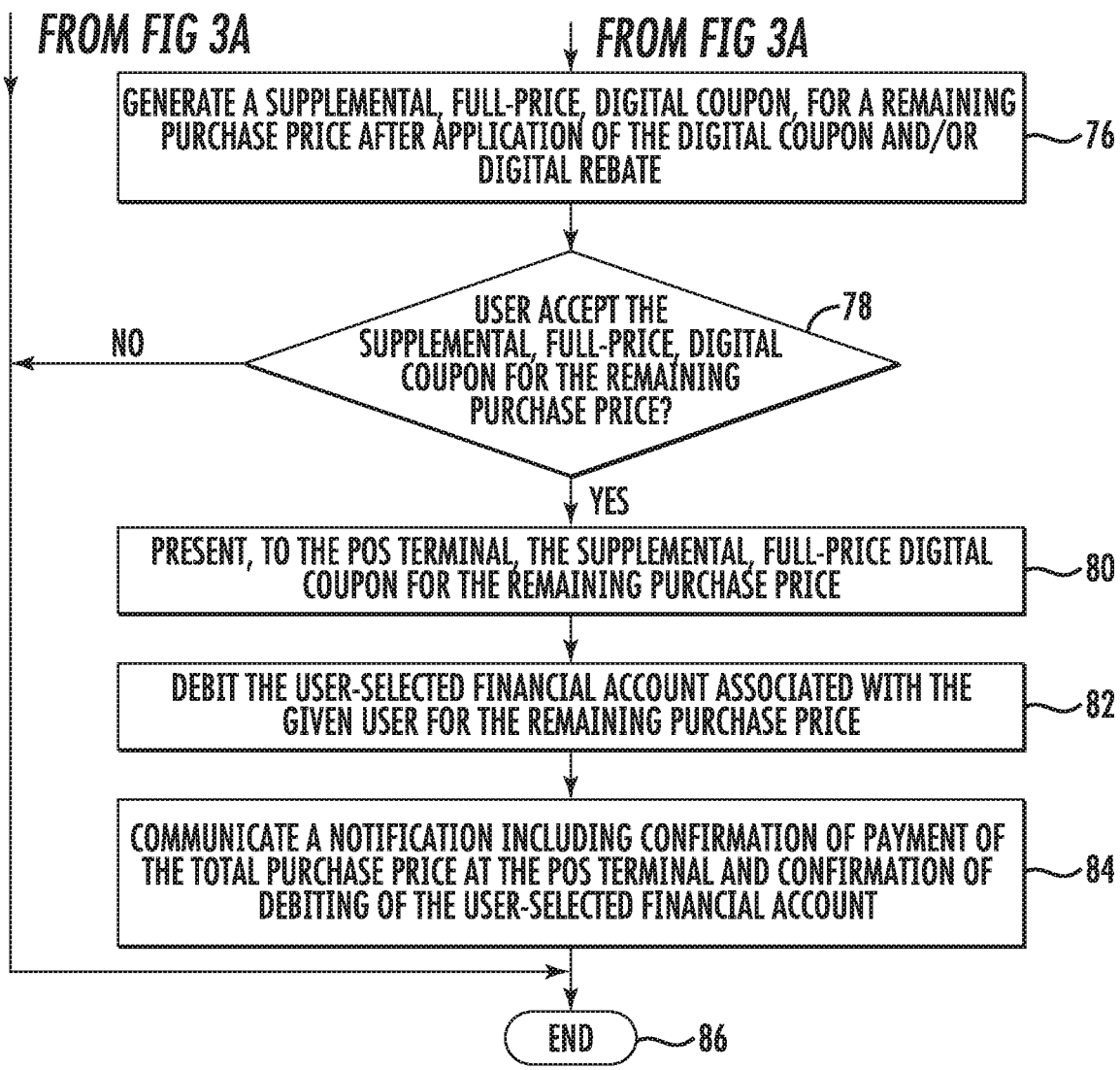

Referring initially to FIGS. 1 and 2, and the flowchart 60 in FIG. 3, a system 20 for processing payment for products for purchase illustratively includes a point-of-sale (POS) terminal 21 and a promotions processing server 30 coupled to the POS terminal. The POS terminal 21 scans products being purchased during a purchase transaction and communicates the products being purchased during the purchase transaction to the promotions processing server 30. In some embodiments, the POS terminal 21 communicates the products on a per-item or per-scan basis so that the promotions processing server 30 knows all the products being purchased as they are being purchased (e.g., in real time). The POS terminal 21 may additionally or alternatively communicate all the products (i.e., the entire basket including all products therein) after all the products have been scanned (i.e., a per-basket basis).

Beginning at Block 62, the promotions processing server 30 includes a processor 31 and a memory 32, for example, a database, cooperating therewith to store, in the memory, digital coupon wallets 34 each associated with a respective user (Block 64). Each digital coupon wallet 34 also has an associated digital coupon value to be used toward the purchase of corresponding products. Each digital coupon wallet 34 may conceptually be considered a digital coupon store (i.e., not physical or paper) that may store "clipped" retailer and/or manufacturer supplied digital coupons, for example, for a discount on the corresponding products.

The promotions processing server 30 by way of cooperation between the processor 31 and memory 32, may store, in the memory, payment wallets 33 (Block 66). Each respective payment wallet 33 is associated with a respective given user and each has financial account data associated with financial accounts. For example, a given user's payment wallet 33 may include credit card numbers, debit card numbers, bank account routing and account numbers, etc. In other words, each payment wallet 33 may conceptually have payment cards and bank information stored therein.

The promotions processing server 30, also by way of cooperation between the processor 31 and memory 32, may store, in the memory, digital rebate wallets 35 (Block 68). Each respective digital rebate wallet 35 is associated with a respective given user and each has rebate information associated therewith. For example, a given user's digital rebate wallet 35 may have a rebate value stored therein to be applicable toward products for purchase. The rebate value may be acquired by processing a rebate from a previous purchase of a product. For example, a given user may have purchased a given product for which there was a digital rebate. Rather than accept a check or cash into the user's bank account, the rebate may be accepted and stored in the user's digital rebate wallet 35. In some embodiments, there may not be any digital rebate wallet 35.

At Block 70, the promotions processing server 30 may authenticate the user based upon the POS terminal 21. For example, the user may enter, at the POS terminal 21, their phone number, loyalty program number, PIN or other identifier that may be used to authenticate the user to both their payment and coupons wallets 33, 34. Of course, the user may be authenticated based upon other and/or additional techniques, for example, biometrics. In some embodiments, the promotions processing server 30 may authenticate the given user based upon a mobile wireless communication device 50 associated with the given user. For example, based upon user input of a PIN or other unique user identifier and/or based upon a user biometric (e.g., finger, retina, etc.) acquired at the mobile wireless communications device 50, the promotions processing server 30 may authenticate the user. If the user is not authenticated, the method ends at Block 86. In some embodiments, the promotions processing server 30 may not authenticate the given user.

At Block 72, upon authentication, the promotions processing server 30 presents, to the POS terminal 21, a digital coupon in the respective digital coupon wallet for a given user for one or more of products being purchased at the POS terminal. More particularly, through cooperation between the POS terminal 21 and the promotions processing server 30, for each of the products being purchased for which there is a digital coupon available, the promotions processing server applies the associated digital coupon value from the corresponding digital coupon wallet 34. For example, the given user may have a digital coupon for $0.50 off Brand-A bread stored in their digital coupon wallet 34. Upon the determination that Brand-A bread is being purchased, the promotions processing server 30 applies the digital coupon of $0.50 off the cost of the Brand A bread.

At Block 74, the promotions processing server 30 may present, to the POS terminal 21, a digital rebate from the respective digital rebate wallet 35. The promotions processing server 30 may apply the digital rebate to the purchase price of one or more products or a total or remaining purchase price after application of digital coupons. More particularly, through cooperation between the POS terminal 21 and the promotions processing server 30, any value for a digital rebate stored in the digital rebate wallet 35 (the value of which to be applied may be user selectable, for example) may be applied to the purchase price of products or a total purchase price.

At Block 76, the promotions processing server 30 generates a supplemental, full-price, digital coupon for a remaining purchase price after application of the digital coupon and/or digital rebate to the purchase price of the one or more products. In other words, the promotions processing server 30 obtains the remaining balance for products being purchased at the POS terminal 21 after application of the digital rebates and coupons, and generates (e.g., in real time, upon obtaining the remaining balance) a digital coupon for any remaining balance after application of digital coupons and rebates.

Figure 4:
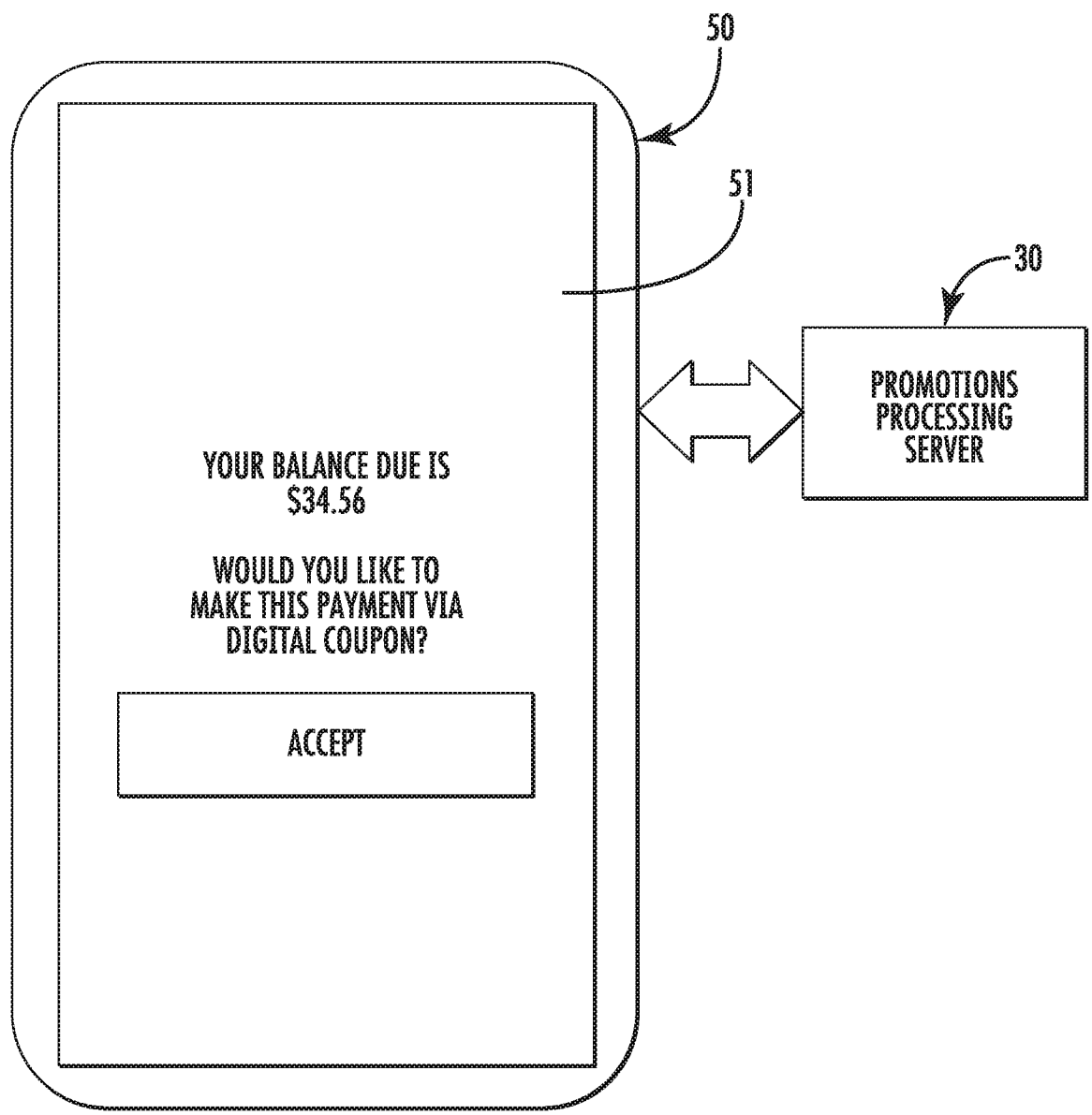
FIG. 4 is a schematic diagram of a portion of a system for processing payment for products for purchase in accordance with an embodiment.

Referring briefly and additionally to FIG. 4, at Block 78, the promotions processing server 30 may prompt the user to accept the supplemental, full-price, digital coupon for the remaining purchase price. The user may be prompted by way of a display, for example, at the POS terminal 21 (FIG. 1) and/or via a display 51 of a mobile wireless communications device 50 associated with the user and coupled, for example, communicatively, with the promotions processing server 30 (FIG. 4). For example, the prompt may request whether the given user wishes to pay the remaining purchase price or balance by way of the generated digital coupon (e.g., instead of by physical payment card or cash). In some embodiments, the promotions processing server 30 may not prompt the given user to accept the supplemental, full-price, digital coupon.

If, at Block 78, the user accepts supplemental, full-price, digital coupon for the remaining purchase price, the promotions processing server 30 presents to the POS terminal 21, the supplemental, full-price, digital coupon (Block 80). Through cooperation between the POS terminal 21 and the promotions processing server 30, the supplemental, full-price, digital coupon is applied to the entire remaining purchase price. In other words, in the remaining purchase price of the products or products being purchased at the POS terminal 21 (after digital coupons and rebates) is $34.56, the supplemental, full-price, digital coupon is generated for $34.56, and upon application of the supplemental, full-price, digital coupon, the user has a zero balance for the product or products. If, at Block 78, the user does not accept the supplemental, full-price, digital coupon for the remaining purchase price, the promotions processing server 30 defers payment processing to the POS terminal 21 for processing of the remaining purchase price as is conventionally performed.

After presenting and applying the supplemental, full-price, digital coupon for the remaining purchase price at Block 80, the promotions processing server 30 debits the user-selected financial account associated with the given user for the remaining purchase price (Block 82). For example, with respect to the example of the remaining purchase price of $34.56 above, the promotions processing server 30 may debit the user-selected financial account (credit card, debit card, etc.) for $34.56. The charge for the $34.56 may appear on a statement of the corresponding financial account as a charge associated with the promotions processing server 30.

Figure 5:
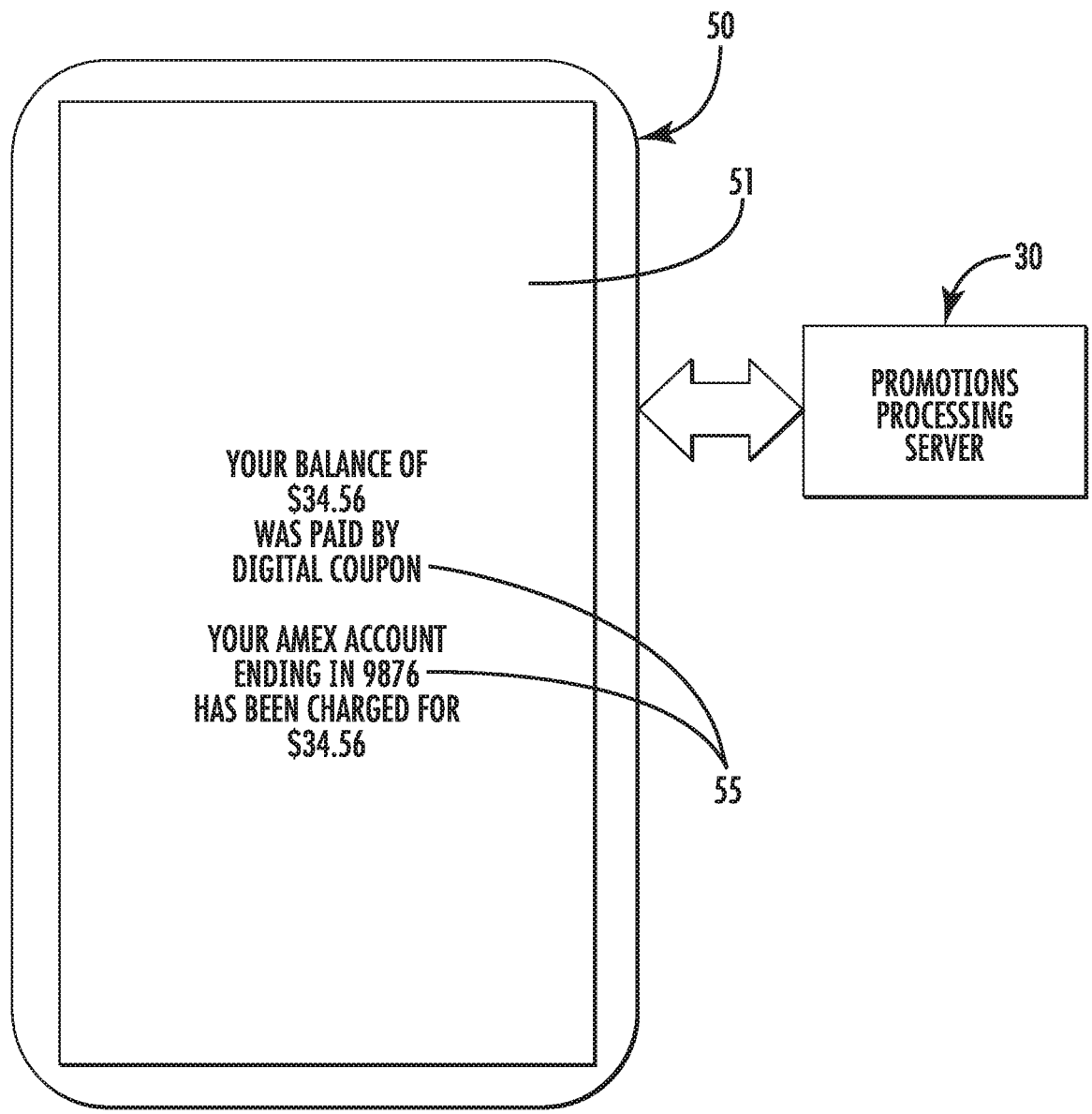
FIG. 5 is a schematic diagram of a portion of a system for processing payment for products for purchase in accordance with an embodiment.

Referring now additionally to FIG. 5, the mobile wireless communications device 50 associated with the given user, may optionally communicate (e.g., wirelessly) with the promotions processing server 30 to communicate a notification 55 to the mobile wireless communications device 50 that may include a total value of the purchase of the products and confirmation of the payment method of financial account used (Block 84). The notification 55 may be in the form of a text or SMS message, application notification, or other type of notification displayed on the display 51 of the mobile wireless communications device 50. The notification 55 may be in addition to the prompting described above. The method ends at Block 86.

As will be appreciated by those skilled in the art, typical mobile payment and digital wallet services, such as, for example, Apple Pay, may be bypassed. Many users (and retailers) already use and have digital coupon and digital rebate processing capabilities within their POS terminals. Accordingly, a retailer's POS terminal 21 may not need separate contactless payment capabilities, as the system 20 processes the payment for the remaining purchase price the same way a digital coupon and/or digital rebate is processed (i.e., using the same technology and communications channels), thereby increasing efficiencies and reducing the amount of parties to the transaction.

A method aspect is directed to a method of processing payment for products for purchase. The method includes using a promotions processing server 30 coupled to a POS terminal 21 to store in a memory 32 a respective digital coupon wallet 34 for each user and present, to the POS terminal, a digital coupon in the respective digital coupon wallet for a given user for at least one product. The method also includes using the promotions processing server 30 to generate a supplemental, full-price, digital coupon for a remaining purchase price after application of the digital coupon to a purchase price of the at least one product and present, to the POS terminal 21, the supplemental, full-price, digital coupon.

A computer readable medium aspect is directed to a non-transitory computer readable medium for processing payment for products for purchase. The non-transitory computer readable medium includes computer executable instructions that when executed by a processor 31 of a promotions processing server 30 cause the processor to perform operations. The operations include storing, in a memory 32 coupled to the processor 31, a respective digital coupon wallet 34 for each user and presenting, to a POS terminal 21 coupled to the processor, a digital coupon in the respective digital coupon wallet for a given user for at least one product. The operations also include generating a supplemental, full-price, digital coupon for a remaining purchase price after application of the digital coupon to a purchase price of the at least one product and presenting, to the POS terminal 21, the supplemental, full-price, digital coupon.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing payment for products for purchase comprising:
    a point-of-sale (POS) terminal; and
    a promotions processing server coupled to said POS terminal and comprising a processor and a memory coupled thereto, said processor configured to
        store in the memory a respective digital coupon wallet for each user,
        present, to the POS terminal, a digital coupon in the respective digital coupon wallet for a given user for at least one product,
        generate a supplemental, full-price, digital coupon for a remaining purchase price after application of the digital coupon to a purchase price of the at least one product, and
        present, to the POS terminal, the supplemental, full-price, digital coupon.

2. The system of claim 1 wherein the processor is configured to prompt the given user to accept the supplemental, full-price, digital coupon for the remaining purchase price; and present, to the POS terminal, the supplemental, full-price, digital coupon based upon acceptance thereof.

3. The system of claim 1 wherein the processor is configured to debit a financial account associated with the given user for the remaining purchase price.

4. The system of claim 1 wherein the processor is configured to store in the memory a respective payment wallet associated with the given user, and comprising financial account data associated with a plurality of financial accounts; and debit a user selected one of the plurality of financial accounts for the remaining purchase price.

5. The system of claim 1 wherein the processor is configured to store in the memory a respective digital rebate wallet associated with the given user; present, to the POS terminal, a digital rebate in the respective digital rebate wallet for the given user; and generate the supplemental, full-price, digital coupon for the remaining purchase price after application of the digital coupon and digital rebate to a purchase price of the at least one product.

6. The system of claim 1 wherein the POS terminal is configured to scan the products being purchased during a purchase transaction.

7. The system of claim 1 wherein the processor is configured to authenticate the given user based upon the POS terminal.

8. The system of claim 1 further comprising a mobile wireless communications device communicating with the processor; and wherein the processor is configured to authenticate the given user based upon the mobile wireless communications device.

9. A promotions processing server for processing payment for products for purchase, the promotions processing server comprising:
 a processor and a memory coupled thereto, the processor configured to
  store in the memory a respective digital coupon wallet for each user,
  present, to a point-of-sale (POS) terminal coupled to the processor, a digital coupon in the respective digital coupon wallet for a given user for at least one product,
  generate a supplemental, full-price, digital coupon for a remaining purchase price after application of the digital coupon to a purchase price of the at least one product, and
  present, to the POS terminal, the supplemental, full-price, digital coupon.

10. The promotions processing server of claim 9 wherein the processor is configured to prompt the given user to accept the supplemental, full-price, digital coupon for the remaining purchase price; and present, to the POS terminal, the supplemental, full-price, digital coupon based upon acceptance thereof.

11. The promotions processing server of claim 9 wherein the processor is configured to debit a financial account associated with the given user for the remaining purchase price.

12. The promotions processing server of claim 9 wherein the processor is configured to store in the memory a respective payment wallet associated with the given user, and comprising financial account data associated with a plurality of financial accounts; and debit a user selected one of the plurality of financial accounts for the remaining purchase price.

13. The promotions processing server of claim 9 wherein the processor is configured to store in the memory a respective digital rebate wallet associated with the given user; present, to the POS terminal, a digital rebate in the respective digital rebate wallet for the given user; and generate the supplemental, full-price, digital coupon for the remaining purchase price after application of the digital coupon and digital rebate to a purchase price of the at least one product.

14. A method of processing payment for products for purchase, the method comprising:
 using a promotions processing server, comprising a processor and a memory coupled thereto, coupled to a point-of-sale (POS) terminal to
  store in the memory a respective digital coupon wallet for each user,
  present, to the POS terminal, a digital coupon in the respective digital coupon wallet for a given user for at least one product,
  generate a supplemental, full-price, digital coupon for a remaining purchase price after application of the digital coupon to a purchase price of the at least one product, and
  present, to the POS terminal, the supplemental, full-price, digital coupon.

15. The method of claim 14 wherein using the promotions processing server comprises using the promotions processing server to prompt the given user to accept the supplemental, full-price, digital coupon for the remaining purchase price; and present, to the POS terminal, the supplemental, full-price, digital coupon based upon acceptance thereof.

16. The method of claim 14 wherein using the promotions processing server comprises using the promotions processing server to debit a financial account associated with the given user for the remaining purchase price.

17. The method of claim 14 wherein using the promotions processing server comprises using the promotions processing server to store in the memory a respective payment wallet associated with the given user, and comprising financial account data associated with a plurality of financial accounts; and debit a user selected one of the plurality of financial accounts for the remaining purchase price.

18. The method of claim 14 wherein using the promotions processing server comprises using the promotions processing server to store in the memory a respective digital rebate wallet associated with the given user; present, to the POS terminal, a digital rebate in the respective digital rebate wallet for the given user; and generate the supplemental, full-price, digital coupon for the remaining purchase price after application of the digital coupon and digital rebate to a purchase price of the at least one product.

19. A non-transitory computer readable medium for processing payment for products for purchase, the non-transitory computer readable medium comprising computer executable instructions that when executed by a processor of a promotions processing server cause the processor to perform operations, the operations comprising:
 storing, in a memory coupled to the processor, a respective digital coupon wallet for each user;
 presenting, to a point-of-sale (POS) terminal coupled to the processor, a digital coupon in the respective digital coupon wallet for a given user for at least one product;
 generating a supplemental, full-price, digital coupon for a remaining purchase price after application of the digital coupon to a purchase price of the at least one product; and
 presenting, to the POS terminal, the supplemental, full-price, digital coupon.

20. The non-transitory computer readable medium of claim 19 wherein the operations comprise prompting the given user to accept the supplemental, full-price, digital coupon for the remaining purchase price; and present, to the POS terminal, the supplemental, full-price, digital coupon based upon acceptance thereof.

21. The non-transitory computer readable medium of claim 19 wherein the operations comprise debiting a financial account associated with the given user for the remaining purchase price.

22. The non-transitory computer readable medium of claim 19 wherein the operations comprise storing in the memory a respective payment wallet associated with the given user, and comprising financial account data associated with a plurality of financial accounts; and debiting a user selected one of the plurality of financial accounts for the remaining purchase price.

* * * * *